(12) United States Patent
Smith et al.

(10) Patent No.: US 12,437,481 B2
(45) Date of Patent: Oct. 7, 2025

(54) SMART GLASSES WITH OUTWARD-FACING DISPLAY

(71) Applicant: Snap Inc., Santa Monica, CA (US)

(72) Inventors: Brian Anthony Smith, New York, NY (US); Rajan Vaish, Beverly Hills, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/303,647

(22) Filed: Jun. 3, 2021

(65) Prior Publication Data

US 2021/0390784 A1     Dec. 16, 2021

Related U.S. Application Data

(60) Provisional application No. 62/705,191, filed on Jun. 15, 2020.

(51) Int. Cl.
*G06T 19/00* (2011.01)
*G02B 27/01* (2006.01)
*G06F 3/04886* (2022.01)
*G09G 3/32* (2016.01)

(52) U.S. Cl.
CPC ........ *G06T 19/006* (2013.01); *G02B 27/0172* (2013.01); *G06F 3/04886* (2013.01); *G09G 3/32* (2013.01); *G02B 2027/0138* (2013.01); *G02B 2027/0141* (2013.01); *G09G 2354/00* (2013.01)

(58) Field of Classification Search
CPC .............. G06T 19/006; G02B 27/0172; G06F 3/04886
See application file for complete search history.

(56) References Cited

U.S. PATENT DOCUMENTS

| | | | |
|---|---|---|---|
| 10,068,374 B2 * | 9/2018 | Miller | G06V 10/40 |
| 10,469,916 B1 * | 11/2019 | Teller | H04N 21/44008 |
| 10,762,712 B2 * | 9/2020 | Valli | G06T 15/20 |
| 2014/0043433 A1 * | 2/2014 | Scavezze | G02B 27/0172 |
| | | | 348/42 |

(Continued)

FOREIGN PATENT DOCUMENTS

| | | |
|---|---|---|
| CN | 110082910 A | 8/2019 |
| WO | 2019150201 | 8/2019 |

OTHER PUBLICATIONS

Jain, P., Farzan, R., & Lee, A. J. (Jun. 2019). Adaptive modelling of attentiveness to messaging: A hybrid approach. In Proceedings of the 27th ACM Conference on User Modeling, Adaptation and Personalization (pp. 261-270).*

(Continued)

*Primary Examiner* — Sarah Lhymn
(74) *Attorney, Agent, or Firm* — Schwegman Lundberg & Woessner, P.A.

(57) ABSTRACT

A wearable device comprises a frame and a pair of optical elements integrated into the frame. The wearable device further comprises an inward-facing display component coupled to the frame, the inward-facing display component to present augmented reality content within a real-world environment that is visible via the pair of optical elements. The wearable device also comprises an outward-facing display component coupled to the frame. The outward-facing display component presents a message.

20 Claims, 9 Drawing Sheets

(56) References Cited

U.S. PATENT DOCUMENTS

| | | | |
|---|---|---|---|
| 2014/0184471 A1* | 7/2014 | Martynov | H04M 1/0266 345/1.2 |
| 2014/0267400 A1* | 9/2014 | Mabbutt | G06F 1/163 345/633 |
| 2014/0317502 A1* | 10/2014 | Brown | G06Q 10/02 715/706 |
| 2015/0073907 A1* | 3/2015 | Purves | G06Q 20/384 705/14.58 |
| 2015/0253573 A1 | 9/2015 | Sako et al. | |
| 2016/0057511 A1* | 2/2016 | Mullins | G06T 19/006 340/870.07 |
| 2016/0203639 A1 | 7/2016 | Bostick et al. | |
| 2016/0327795 A1 | 11/2016 | Jarvenpaa et al. | |
| 2017/0087464 A1* | 3/2017 | Perry | A63F 13/355 |
| 2017/0134564 A1* | 5/2017 | Almurayh | H04M 1/72457 |
| 2017/0230640 A1 | 8/2017 | Rochford et al. | |
| 2017/0365101 A1* | 12/2017 | Samec | A61B 3/09 |
| 2018/0004478 A1* | 1/2018 | Chen | A63F 13/212 |
| 2018/0024799 A1 | 1/2018 | Jarvenpaa et al. | |
| 2018/0246334 A1 | 8/2018 | Yajima | |
| 2018/0314416 A1* | 11/2018 | Powderly | G06F 3/041 |
| 2019/0235246 A1 | 8/2019 | Hu et al. | |
| 2019/0285881 A1* | 9/2019 | Ilic | G06F 3/013 |
| 2019/0354334 A1* | 11/2019 | Billinghurst | G06F 3/013 |
| 2019/0366210 A1* | 12/2019 | Beltran | A63F 13/352 |
| 2020/0065052 A1* | 2/2020 | Lewbel | G09G 5/38 |
| 2020/0287849 A1* | 9/2020 | G | H04L 51/02 |
| 2020/0355927 A1* | 11/2020 | Marcellin-Dibon | G02B 27/0176 |
| 2021/0042979 A1* | 2/2021 | Ballagas | G06F 3/013 |
| 2021/0286502 A1* | 9/2021 | Lemay | G06F 3/0304 |
| 2021/0373676 A1* | 12/2021 | Jorasch | G06F 3/0487 |
| 2022/0107502 A1* | 4/2022 | Robaina | G02B 27/01 |

OTHER PUBLICATIONS

Poláček, R. (May 2020). User interface concept for smart glasses.*

"International Application Serial No. PCT/US2021/037024, International Search Report mailed Sep. 3, 2021", 5 pgs.

"International Application Serial No. PCT/US2021/037024, Written Opinion mailed Sep. 3, 2021", 9 pgs.

Ceneviva, Zach, "Smart Glasses", EDSGN 100—Technology Presentation, https://sites.psu.edu/ned5156/?s=smart+glasses, [Online] Retrieved from the Internet: <URL:https://cpb-us-east-1-juclugurlqwqqqo4.stackpathdns.com/sites.psu.edu/dist/b/40062/files/2016/05/Smart-Glasses-Presentation.pdf> [Retrieved on Aug. 25, 2021], (May 2, 2016), 13 pgs.

"European Application Serial No. 21737893.4, Communication Pursuant to Article 94(3) EPC mailed Apr. 22, 2025", 11 pgs.

"European Application Serial No. 21737893.4, Response to Communication pursuant to Rules 161 and 162 EPC filed Jul. 20, 2023", 11 pgs.

"Korean Application Serial No. 10-2023-7001591, Notice of Preliminary Rejection mailed Jan. 6, 2025", w/ English translation, 20 pgs.

"Korean Application Serial No. 10-2023-7001591, Response filed Mar. 5, 2025 to Notice of Preliminary Rejection mailed Jan. 6, 2025", w/ English claims, 26 pgs.

"Chinese Application Serial No. 202180056461.9, Office Action mailed May 27, 2025", W/ English Translation, 19 pgs.

* cited by examiner

SMART GLASSES WITH OUTWARD-FACING DISPLAY

This application claims the benefit of priority to U.S. Provisional Application Ser. No. 62/705,191, filed on Jun. 15, 2020, which is incorporated herein by reference in its entirety.

TECHNICAL FIELD

The present disclosure generally relates to mobile and wearable computing technology. In particular, example embodiments of the present disclosure address systems, methods, devices, and user interfaces for smart glasses with an outward-facing display.

BACKGROUND

Wearable devices such as "smart" glasses can be used to create engaging and entertaining augmented reality experiences, in which two or three-dimensional (3D) graphics content appears to be present in the real world. Smart glasses can create these augmented reality experiences by displaying augmented reality content within a near-eye display mechanism integrated into optical elements of the smart glasses such that the augmented reality content appears to a user wearing the glasses to be within a real-world environment that is viewable through the optical elements.

BRIEF DESCRIPTION OF THE DRAWINGS

To easily identify the discussion of any particular element or act, the most significant digit or digits in a reference number refer to the figure number in which that element or act is first introduced.

DETAILED DESCRIPTION

Figure 1:
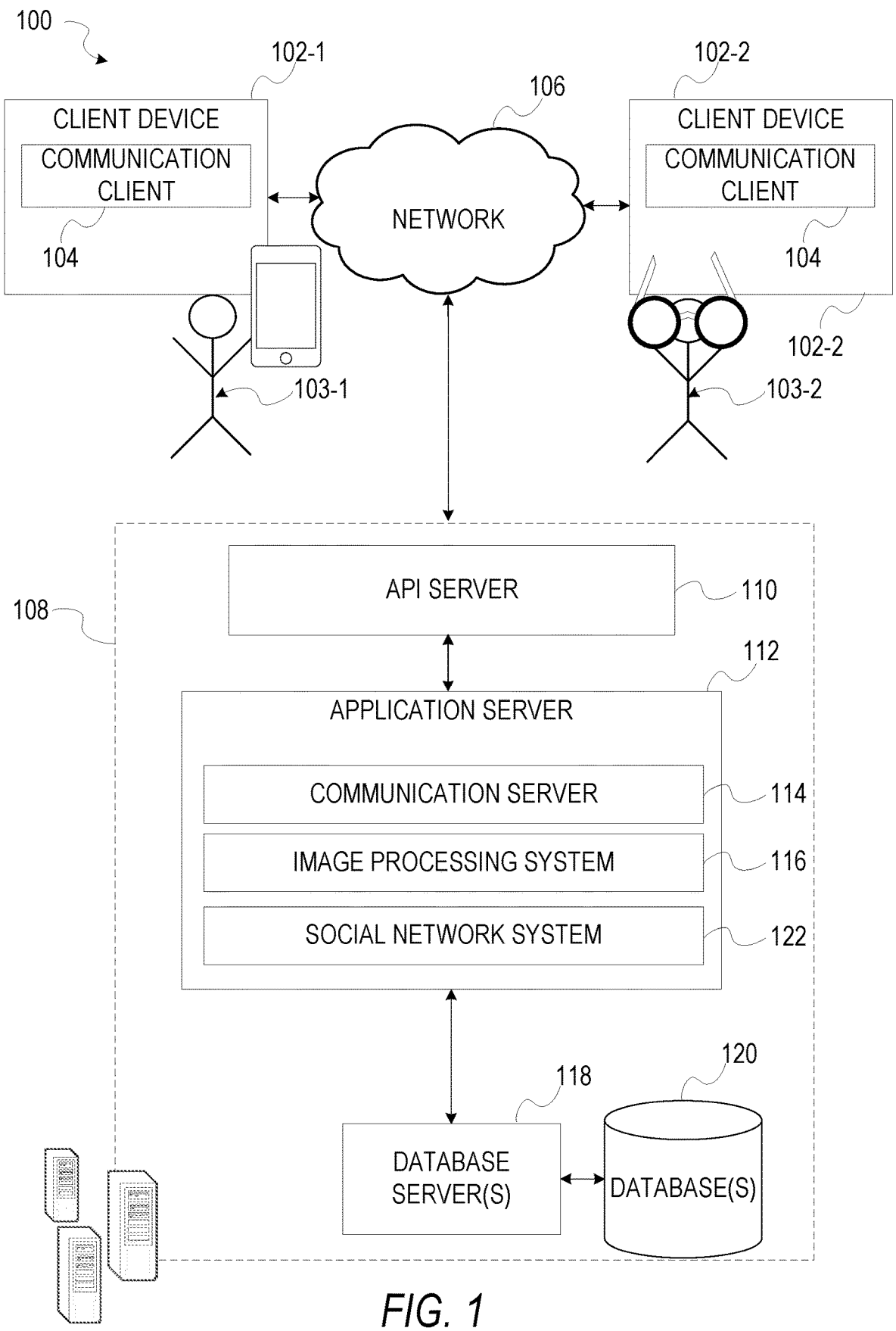
FIG. 1 is a diagrammatic representation of a networked environment in which the present disclosure may be deployed, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As noted above, wearable devices can be used to create engaging and entertaining augmented reality experiences for users. However, while a user is engaged in an augmented reality experience, others around the user will be unable to see what the user is looking at due to the lack of an outward-facing display screen. This lack of a display screen also prevents the wearing user to share their status or communicate with the others, thereby causing a communication disconnect that can hinder the adoption and social acceptability of smart glasses.

Among other things, embodiments of the present disclosure improve augmented reality experiences with a wearable device that includes an outward-facing display component. The outward-facing display component can facilitate communication with external observers of a user engaged in an augmented reality by presenting both user-initiated and system-initiated messages. These messages can include keyboard input data (e.g., text and emojis), graphical representations of users (e.g., an avatar), images, and other graphical content. The outward-facing display component can display a user-initiated messages specified by the user wearing the wearable device or by a remote user who is authorized to post messages to the wearable device of another. For example, the outward-facing display component can present messages such as "Tired, hoping for a seat" when the wearing user is using public transportation, "I am hiring, please enquire if you are interested" at a conference, or "Happy Holidays" during the holiday season. As another example, a remote user can cause the outward-facing display component of another user's device to display "Hello" to the person in front of the wearing user. Such messages can be specified by a user using input components of a wearable device or from a smart phone or other device that may be in communication with the wearable device.

The outward-facing display component can display a system-initiated message based on a current status of the user that is inferred based on context data received from one or more devices of the user wearing the device. For example, based on context data, the outward-facing display component can generate and present messages such as "busy," "happy," or "currently listening to music" to those within view. As another example, the outward-facing display component can present a current status of the user by presenting an augmented reality experience that the user is engaged in via an inward-facing display component. In this way, external observers will be able to see what the wearing user is seeing.

The outward-facing display can also be used to facilitate game play between wears or with users who are within view of the display. That is, remote friends can play games with a wearer, a wearer can play games with people in front of them, or combinations of both.

By allowing other users to see what a wearing user is seeing and allowing the wearing user to broadcast messages to others, the outward-facing display component reduces the lack of social presence and connection that is a major limitation of conventional augmented reality experiences.

Generally, the outward facing display component of the wearable device allows a wearing user to communicate within others in their vicinity despite being occupied with an augmented reality experience that would otherwise preclude the wearing user from being able to communicate.

FIG. 1 is a block diagram showing an example communication system 100 for exchanging data (e.g., messages and associated content) over a network. The communication system 100 includes multiple instances of a client device 102, each of which hosts a number of applications including a communication client 104. Each communication client 104 is communicatively coupled to other instances of the communication client 104 and a communication server system 108 via a network 106 (e.g., the Internet).

A communication client 104 is able to communicate and exchange data with another communication client 104 and with the communication server system 108 via the network 106. The data exchanged between communication clients 104, and between a communication client 104 and the communication server system 108, includes functions (e.g., commands to invoke functions) as well as payload data (e.g., text, audio, video or other multimedia data).

The communication server system 108 provides server-side functionality via the network 106 to a particular communication client 104. While certain functions of the communication system 100 are described herein as being performed by either a communication client 104 or by the communication server system 108, the location of certain functionality either within the communication client 104 or the communication server system 108 is a design choice. For example, it may be technically preferable to initially deploy certain technology and functionality within the communication server system 108, but to later migrate this technology and functionality to the communication client 104 where a client device 102 has a sufficient processing capacity.

The communication server system 108 supports various services and operations that are provided to the communication client 104. Such operations include transmitting data to, receiving data from, and processing data generated by the communication client 104. This data may include, message content, client device information, geolocation information, media annotation and overlays, message content persistence conditions, social network information, and live event information, as examples. Data exchanges within the communication system 100 are invoked and controlled through functions available via user interfaces (UIs) of the communication client 104.

Turning now specifically to the communication server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the communication client 104 in order to invoke functionality of the application server 112. The Application Program Interface (API) server 110 exposes various functions supported by the application server 112, including account registration, login functionality, the sending of messages, via the application server 112, from a particular communication client 104 to another communication client 104, the sending of media files (e.g., images or video) from a communication client 104 to the communication server 114, and for possible access by another communication client 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the communication client 104).

The application server 112 hosts a number of applications and subsystems, including a communication server 114, an image processing system 116, and a social network system 122. The communication server 114 implements a number of message processing technologies and functions, particularly related to the aggregation and other processing of content (e.g., textual and multimedia content) included in messages received from multiple instances of the communication client 104. As will be described in further detail, the text and media content from multiple sources may be aggregated into collections of content (e.g., called stories or galleries). These collections are then made available, by the communication server 114, to the communication client 104. Other processor and memory intensive processing of data may also be performed server-side by the communication server 114, in view of the hardware requirements for such processing.

The communication server 114 also facilities augmented reality experiences among users. In an example, the client device 102-2 comprises a wearable device (e.g., smart glasses) worn by user 103-2. The wearable device may include optical elements through which the real-world environment of the user 103-2 is visible to the user 103-2. The wearable device may further include an inward display component coupled to the optical elements that displays content that is visible to the user 103-2. The inward display component may be a transparent display integrated into one or more of the optical elements or another near-eye display mechanism. An augmented reality experience can be created within the real-world environment that is visible to the user 103-2 by causing one or more augmented reality content items (either 2D or 3D) to be displayed by the inward-facing display component. In this way, the one or more augmented reality content items appear to the user 103-2 as though they exist in the real-world environment.

In addition to the inward display component, the wearable device further includes an outward-facing display component to communicate messages to external observers of the user 103-2 (e.g., other people in the vicinity of the user 103-2). For example, the outward-facing display component can display a message specified by the user 103-2 (e.g., using a message configuration interface provided by the communication server 114). In another example, the outward-facing display component can display a message based on a current status of the user 103-2 inferred by the communication system 100 based on context data. The context data provides information about the user 103-2, from which the current status can be inferred. The context data may, for example, include: user input data; biometric data; motion data; environmental data; position data; temporal data; weather data; image data generated at client device 102-2; and audio data produced at the device.

The application server 112 also includes an image processing system 116 that is dedicated to performing various image processing operations, typically with respect to images or video generated and displayed by instances of the client device 102-2.

The social network system 122 supports various social networking functions services, and makes these functions and services available to the communication server 114. To this end, the social network system 122 maintains and accesses an entity graph within the database 120. Examples of functions and services supported by the social network system 122 include the identification of other users of the communication system 100 with which a particular user has relationships or is "following", and also the identification of other entities and interests of a particular user.

The application server 112 is communicatively coupled to a database server 118, which facilitates access to a database 120 in which is stored data associated with messages processed by the communication server 114.

Figure 2:
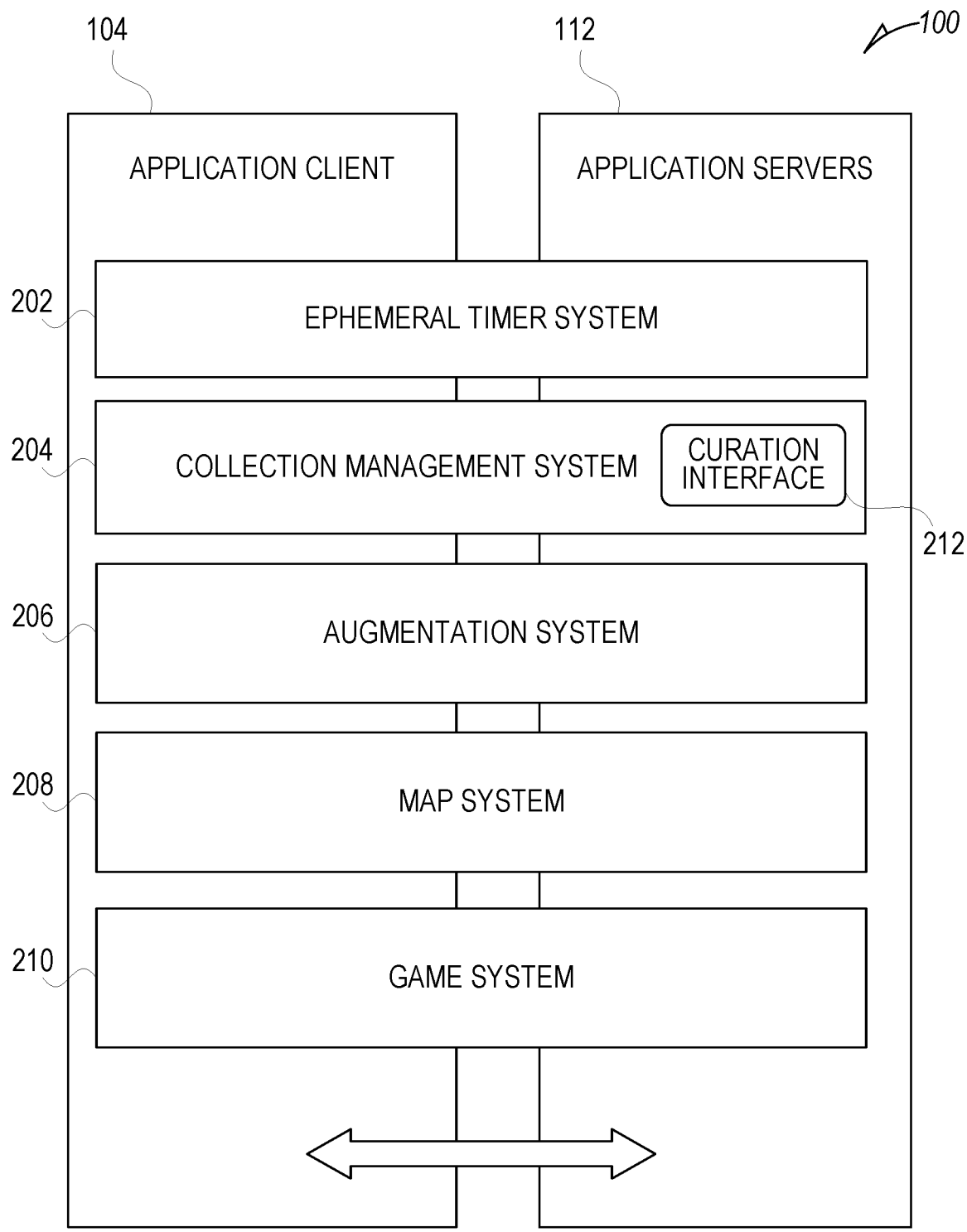
FIG. 2 is a diagrammatic representation of a communication system, in accordance with some example embodiments.

FIG. 2 is a block diagram illustrating further details regarding the communication system 100, according to some examples. Specifically, the communication system 100 is shown to comprise the communication client 104 and the application servers 112. The communication system 100 embodies a number of subsystems, which are supported on the client-side by the communication client 104 and on the sever-side by the application servers 112. These subsystems include, for example, an ephemeral timer system 202, a collection management system 204, an augmentation system 206, a map system 208, and a game system 210.

The ephemeral timer system 202 is responsible for enforcing a temporary or time-limited access to content by the communication client 104 and the communication server 114. The ephemeral timer system 202 incorporates a number of timers that, based on duration and display parameters associated with a message, or collection of messages (e.g., a story), selectively enable access (e.g., for presentation and display) to messages and associated content via the communication client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the communication client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the communication system 100. The augmentation system 206 operatively supplies a media overlay or augmentation (e.g., an image filter) to the communication client 104 based on a geolocation of the client device 102. In another example, the augmentation system 206 operatively supplies a media overlay to the communication client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

The augmentation system 206 provides various functions that enable augmented reality experiences. For example, the augmentation system 206 provides functions related to application of virtual enhancements to real-world environments whether through display of augmented reality content items on transparent displays through which a real-world environment is visible or through augmenting image data to include augmented reality content items overlaid on real-world environments depicted therein. The virtual enhancements may comprise one or more augmented reality content items. The virtual enhancements may be stored in the database(s) 120 and accessed through the database server(s) 118.

An augmented reality content item may be a real-time special effect and sound that may be added to an image or a video. Augmented reality content items, overlays, image transformations, augmented reality images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time.

This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model, to transform image data using face detection, the face is detected on an image with use of a specific face detection algorithm (e.g., Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of the augmentation system 206 can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some example embodiments, a computer animation model to transform image data can be used by a system where a user may capture an image or video stream of the user (e.g., a selfie) using a client device 102 having a neural network operating as part of a communication client 104 operating on the client device 102. The transform system operating within the communication client 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine-taught neural networks may be used to enable such modifications.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

The map system 208 provides various geographic location functions, and supports the presentation of map-based media content and messages by the communication client 104. For example, the map system 208 enables the display of user icons or avatars (e.g., stored in profile data) on a map to indicate a current or past location of "friends" of a user, as well as media content (e.g., collections of messages including photographs and videos) generated by such friends, within the context of a map. For example, a message posted by a user to the communication system 100 from a specific geographic location may be displayed within the context of a map at that particular location to "friends" of a specific user on a map interface of the communication client 104. A user can furthermore share his or her location and status information (e.g., using an appropriate status avatar) with other users of the communication system 100 via the communication client 104, with this location and status information being similarly displayed within the context of a map interface of the communication client 104 to selected users.

The game system 210 provides various gaming functions within the context of the communication client 104. The communication client 104 provides a game interface providing a list of available games that can be launched by a user within the context of the communication client 104, and played with other users of the communication system 100. The communication system 100 further enables a particular user to invite other users to participate in the play of a specific game, by issuing invitations to such other users from the communication client 104. The communication client 104 also supports both the voice and text messaging (e.g., chats) within the context of gameplay, provides a leaderboard for the games, and also supports the provision of in-game rewards (e.g., coins and items).

Figure 3A:
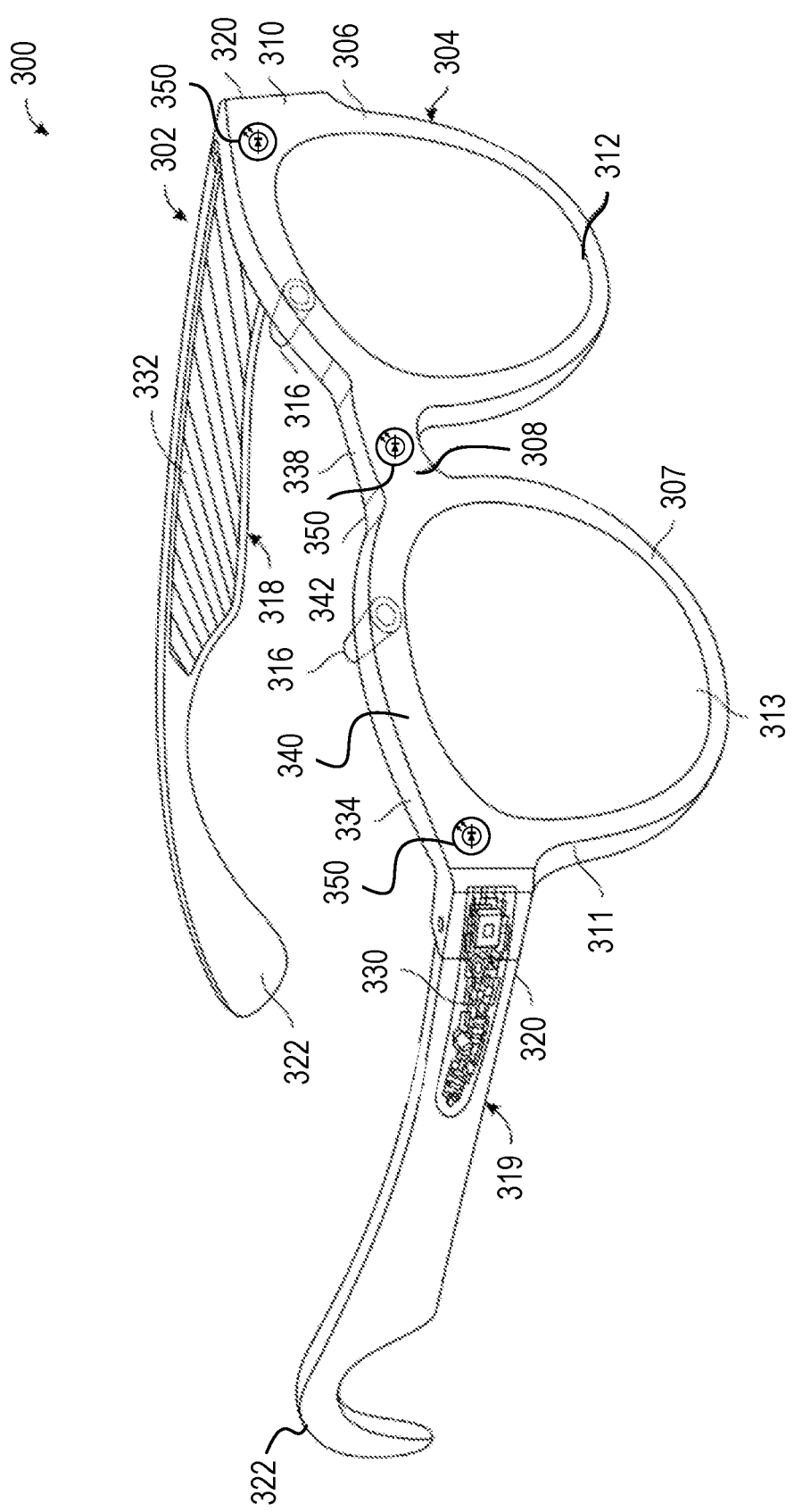
FIGS. 3A and 3B are diagrams illustrating a wearable device with an outward-facing display, according to some example embodiments.

FIG. 3A is a diagram illustrating a wearable device in the example form of glasses 300, according to some example embodiments. The glasses 300 can include a frame 302 made from any suitable material such as plastic or metal, including any suitable shape memory alloy. The frame 302 can have a front piece 304 that can include a first or left lens, display, or optical element holder 306 and a second or right lens, display, or optical element holder 307 connected by a bridge 308. The front piece 304 additionally includes a left end portion 310 and a right end portion 311. The glasses 300 further include a pair of optical elements. A first or left optical element 312 and a second or right optical element 313 can be provided within respective left and right optical element holders 306, 307. Each of the optical elements 312, 313 can be a lens, a display (e.g., a transparent display), a display assembly, or a combination of the foregoing. For example, the glasses 300 can include an inward-facing display component comprising an integrated near-eye display mechanism that enables, for example, display to the user of preview images for visual media captured by cameras 316 of the glasses 300. The integrated near-eye display mechanism also facilitates augmented reality experiences by displaying augmented reality content such that it is overlaid on a real-world environment that is viewable through the optical elements 312 and 313.

The frame 302 additionally includes a left arm or temple piece 318 and a right arm or temple piece 319 coupled to the respective left and right end portions 310, 311 of the front piece 304 by any suitable means, such as a hinge (not shown), so as to be coupled to the front piece 304, or rigidly or fixably secured to the front piece 304 so as to be integral with the front piece 304. Each of the temple pieces 318 and 319 can include a first portion 320 that is coupled to the respective end portion 310 or 311 of the front piece 304 and any suitable second portion 322, such as a curved or arcuate piece, for coupling to the ear of the user. In one embodiment, the front piece 304 can be formed from a single piece of material, so as to have a unitary or integral construction. In one embodiment, the entire frame 302 can be formed from a single piece of material so as to have a unitary or integral construction.

The glasses 300 can include a device, such as a computer 330, which can be of any suitable type so as to be carried by the frame 302 and, in one embodiment, of a suitable size and shape so as to be at least partially disposed in one of the temple pieces 318 and 319. In one embodiment, the computer 330 has a size and shape similar to the size and shape of one of the temple pieces 318, 319 and is thus disposed almost entirely if not entirely within the structure and confines of such temple pieces 318 and 319. In one embodiment, the computer 330 can be disposed in both of the temple pieces 318, 319. The computer 330 can include one or more processors with memory, wireless communication circuitry, and a power source. The computer 330 comprises low-power circuitry, high-speed circuitry, and a display processor. Various other embodiments may include these elements in different configurations or integrated together in different ways.

The computer 330 additionally includes a battery 332 or other suitable portable power supply. In one embodiment, the battery 332 is disposed in one of the temple pieces 318 or 319. In the glasses 300 shown in FIG. 3A, the battery 332 is shown as being disposed in the left temple piece 318 and electrically coupled using a connection 334 to the remainder of the computer 330 disposed in the right temple piece 319. One or more I/O devices can include a connector or port (not shown) suitable for charging a battery 332 accessible from the outside of the frame 302, a wireless receiver, transmitter, or transceiver (not shown), or a combination of such devices.

The glasses 300 include digital cameras 316. Although two cameras 316 are depicted, other embodiments contemplate the use of a single or additional (i.e., more than two) cameras. For ease of description, various features relating to the cameras 316 will further be described with reference to only a single camera 316, but it will be appreciated that these features can apply, in suitable embodiments, to both cameras 316.

In various embodiments, the glasses 300 may include any number of input sensors or peripheral devices in addition to the cameras 316. The front piece 304 is provided with an outward-facing, forward-facing, front, or outer surface 340 that faces forward or away from the user when the glasses 300 are mounted on the face of the user, and an opposite inward-facing, rearward-facing, rear, or inner surface 342 that faces the face of the user when the glasses 300 are mounted on the face of the user. Such sensors can include inward-facing video sensors or digital imaging modules such as cameras that can be mounted on or provided within the inner surface 342 of the front piece 304 or elsewhere on the frame 302 so as to be facing the user, and outward-facing video sensors or digital imaging modules such as the cameras 316 that can be mounted on or provided with the outer surface 340 of the front piece 304 or elsewhere on the frame 302 so as to be facing away from the user. Such sensors, peripheral devices, or peripherals can additionally include biometric sensors, location sensors, accelerometers, or any other such sensors.

In addition, the glasses 300 may include one or more outward-facing display components mounted on or provided within the outer surface 340 of the front piece 304 of the frame 302 or integrated into one or more of the optical elements 312 or 313. The outward-facing display component (also referred to as an "outward display component") can present both user-initiated and system-initiated messages to external observers of the user wearing the glasses 300. That is, while the inward-facing display component(s) of the glasses 300 present content to the user wearing the glasses 300, the outward-facing display component is position on the frame 302 to face the opposite direction of the inward-facing display component and is used to communicate information to onlookers, thereby reducing or even eliminating the communication gap between a user participating in an augmented reality experiences and others in the surrounding environment of the user. User-initiated messages presented by the outward-facing display component are specified by the user wearing the glasses 300 or other users of the communication system 100. System-initiated messages are automatically generated and can include a status of the user wearing the glasses 300 inferred by the communication system 100. The outward-facing display component can also be used to facilitate games played between with external observers as well as other users of the glasses 300.

As an example of the outward-facing display component, FIG. 3A illustrates a set of illuminating display elements 350. Each illuminating display element 350 may include a light emitting diode or other lower-power element capable of illumination. The set of illuminating display elements 350 can present various messages using various colors, intensities, patterns, and durations of illumination. Although FIG. 3A illustrates the glasses 300 as including three illuminating display elements 350, the glasses 300 are not limited to three illuminating display elements 350, and may include more or fewer illuminating display elements 350 in other embodiments. Further, although the illuminating display elements 350 are illustrated in FIG. 3A as being positioned at a particular location on the frame 302, it shall be appreciated that no illuminating display element 350 is limited to its illustrated position on the frame 302. That is, an illuminating display element 350 can be positioned on any outward-facing surface of the frame 302 including any outward-facing surface of the front piece 304 or temple pieces 318, 319.

Figure 3B:
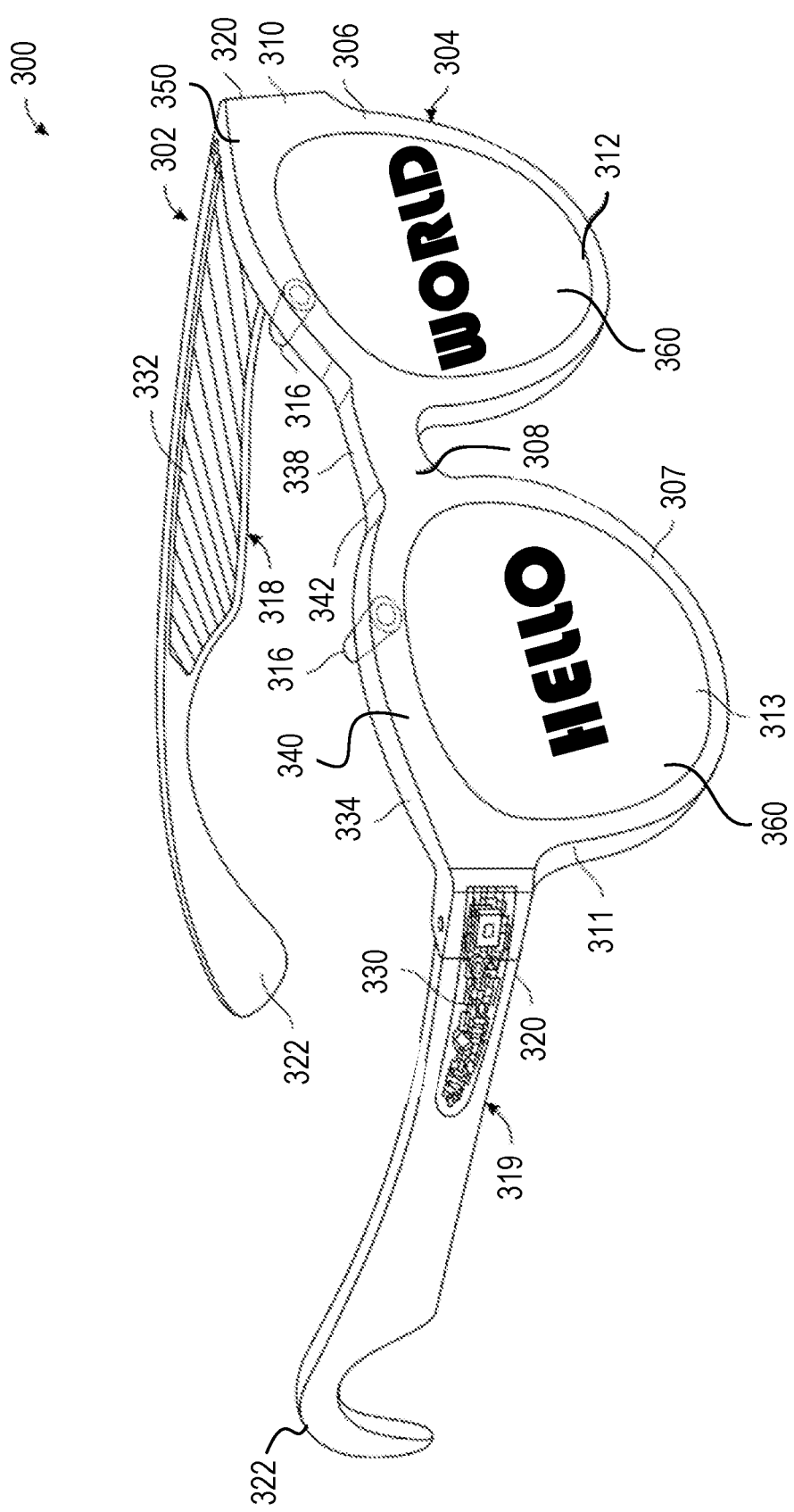

As another example of the outward-facing display component, FIG. 3B illustrates an outward-facing display 360 integrated into the optical elements 312 and 313. The outward-facing display 360 is capable of displaying messages that include keyboard input data (e.g., text and emojis), graphical representations of users (e.g., an avatar), images, and other graphical content. The outward-facing display may, in some embodiments, be or include a liquid crystal display (LCD). The outward-facing display 360 may, for example, comprise a transparent display integrated into optical elements 312 and 313. In some embodiments, the optical elements 312 and 313 include layered transparent displays with at least a first layer providing the inward-facing display mechanism and a second layer providing the outward-facing display mechanism. It shall be appreciated that although FIG. 3B illustrates the outward-facing display 360 being integrated into the optical elements 312 and 313, the outward-facing display 360 can be mounted or otherwise integrated into any outward-facing surface of the frame 302 including any outward-facing surface of the front piece 304 or temple pieces 318, 319.

Figure 4:
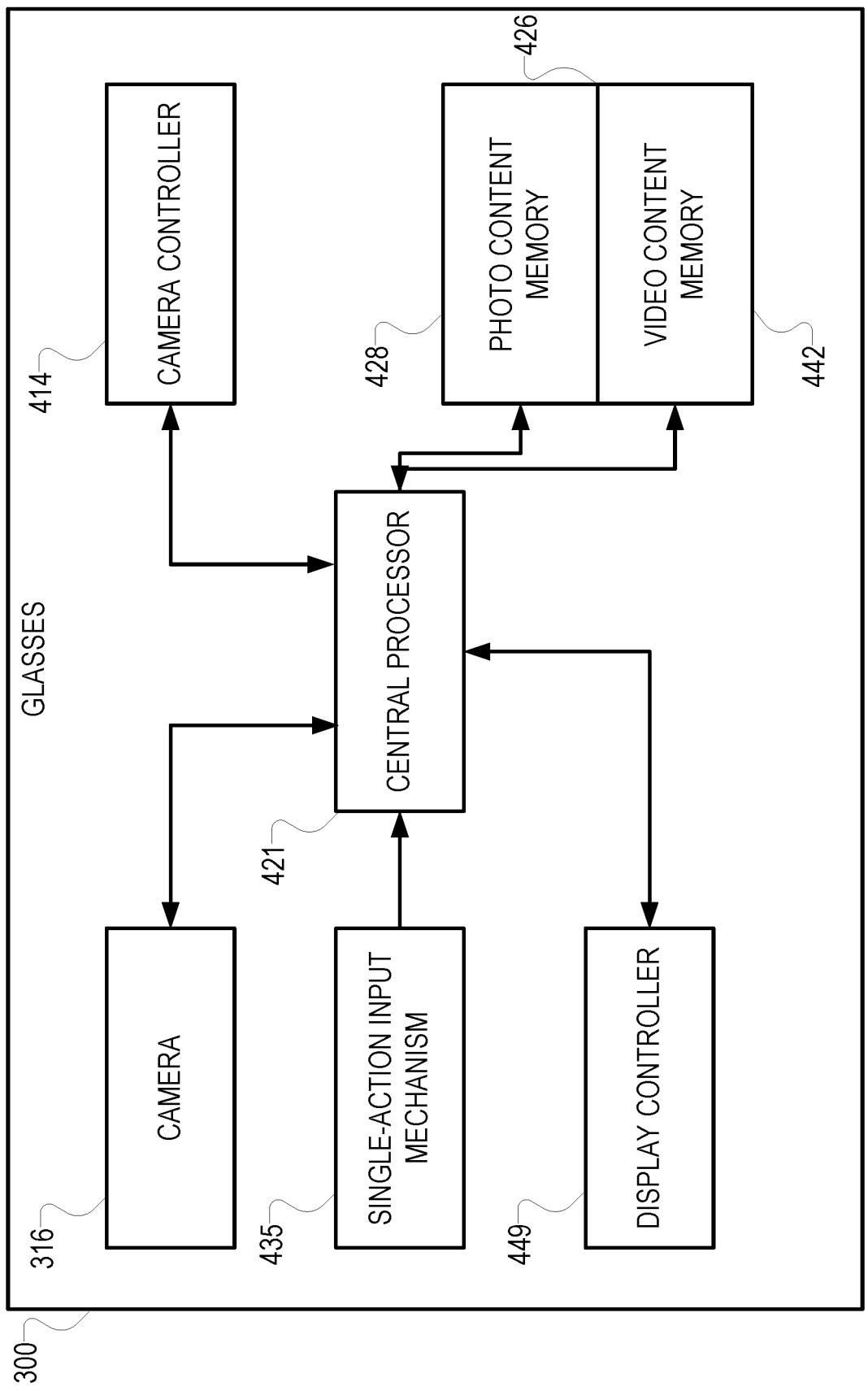
FIG. 4 is a block diagram illustrating aspects of the wearable device, according to some example embodiments.

FIG. 4 is a block diagram illustrating aspects of the wearable device in the example form of the glasses 300, according to some example embodiments. The computer 330 of the glasses 300 includes a central processor 421 in communication with an onboard memory 426. The central processor 421 may be a CPU and/or a graphics processing unit (GPU). The memory 426 in this example embodiment comprises a combination of flash memory and random-access memory.

The glasses 300 further include a camera controller 414 in communication with the central processor 421 and the camera 316. The camera controller 414 comprises circuitry configured to control recording of either photographic content or video content based upon processing of control signals received from the single-action input mechanism that includes the camera control button, and to provide for automatic adjustment of one or more image-capture parameters pertaining to capturing of image data by the camera 316 and on-board processing of the image data prior to persistent storage thereof and/or to presentation thereof to the user for viewing or previewing.

In some embodiments, the camera controller 414 comprises permanently configured circuitry, such as firmware or an application-specific integrated circuit (ASIC) configured to perform the various functions described herein. In other embodiments, the camera controller 414 may comprise a dynamically reconfigurable processor executing instructions that temporarily configure the processor to execute the various functions described herein.

The camera controller 414 interacts with the memory 426 to store, organize, and present image content in the form of photo content and video content. To this end, the memory 426 in this example embodiment comprises a photo content memory 428 and a video content memory 442. The camera controller 414 is thus, in cooperation with the central processor 421, configured to receive from the camera 316 image data representative of digital images produced by the camera 316 in accordance with some of the image-capture parameters, to process the image data in accordance with some of the image-capture parameters, and to store the processed image data in an appropriate one of the photo content memory 428 and the video content memory 442.

The camera controller 414 is further configured to cooperate with a display controller 449 to cause display on a display mechanism incorporated in the glasses 300 of selected photos and videos in the memory 426 and thus to provide previews of captured photos and videos. In some embodiments, the camera controller 414 will manage processing of images captured using automatic bracketing parameters for inclusion in a video file. The display controller 449 is further responsible for providing control signals to the display mechanism to create augmented reality experiences and to communicate messages to external observers.

A single-action input mechanism 435 is communicatively coupled to the central processor 421 and the camera controller 414 to communicate signals representative of a current state of the camera control button and thereby to communicate to the camera controller 414 whether or not the camera control button is currently being pressed. The camera controller 414 further communicates with the central processor 421 regarding the input signals received from the single-action input mechanism 435. In one embodiment, the camera controller 414 is configured to process input signals received via the single-action input mechanism 435 to determine whether a particular user engagement with the camera control button is to result in a recording of video content or photographic content and/or to dynamically adjust one or more image-capture parameters based on processing of the input signals. For example, pressing of the camera control button for longer than a predefined threshold duration causes the camera controller 414 automatically to apply relatively less rigorous video processing to captured video content prior to persistent storage and display thereof. Conversely, pressing of the camera control button for shorter than the threshold duration in such an embodiment causes the camera controller 414 automatically to apply relatively more rigorous photo stabilization processing to image data representative of one or more still images.

The glasses 300 may be a stand-alone client device that is capable of independent operation or may be a companion device that works with a primary device to offload intensive processing and/or exchange data over the network 106 with the communication server system 108. The glasses 300 may further include various components common to mobile electronic devices such as smart glasses or smart phones (for example, including a display controller for controlling display of visual media (including photographic and video content captured by the camera 316) on a display mechanism incorporated in the device). Note that the schematic diagram of FIG. 4 is not an exhaustive representation of all components forming part of the glasses 300.

Figure 5:
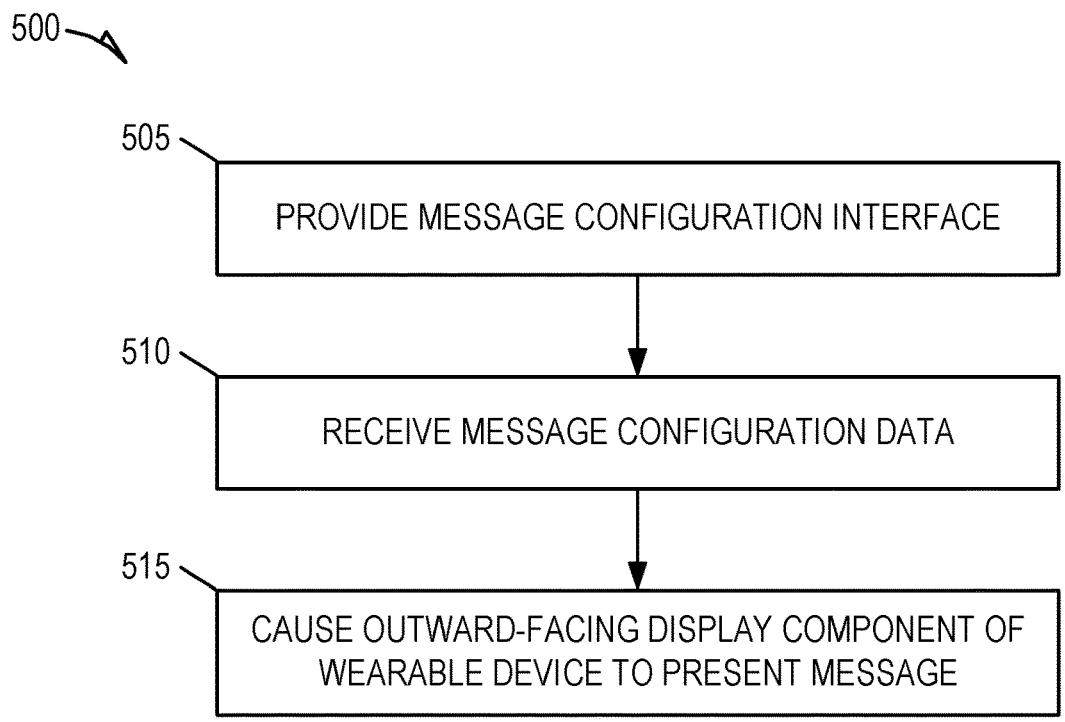
FIG. 5 is a flowchart illustrating operations of the communication system in performing a method for using an outward-facing display component of wearable device to communicate a message to an external observer, according to example embodiments.

FIG. 5 is a flowchart illustrating operations of the communication system 100 in performing a method 500 for using an outward-facing display component of wearable device to communicate a user-initiated message to an external observer, according to example embodiments. The method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 500 is performed by functional components of the communication system 100. While the operations are described below as being performed by a processing device, it shall be appreciated that the operations of the method 500 may not necessarily be performed by the same processing device. As mentioned above, the location of certain functionality is merely a design choice. Accordingly, any one or more of the operations of the method 500 can be performed by any one or more of the client device 102-1, the client device 102-2, the communication server system 108, or the glasses 300.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing device causes display of a message configuration interface that enables a user to configure a message to be presented by an outward-facing display component (e.g., illuminating display element 350 or outward-facing display 360) of a wearable device (e.g., the glasses 300). The wearable device is associated with and may be worn by a first user (e.g., the user 103-2). The message configuration interface includes one or more input fields to compose a message. The one or more input fields may receive keyboard input (e.g., text and emojis), image data (e.g., videos and images), and other graphical content (e.g., maps and augmented reality content). The message configuration interface may further provide a selectable set of message templates comprising text, graphics, image content and various combinations thereof.

In some embodiments, the processing device causes display of the message configuration interface on an inward-facing display of the wearable device (e.g., glasses 300). In some embodiments, the wearable device may be configured as a companion device to a primary device (e.g., a smart phone) and the processing device causes the primary device to display the message configuration interface.

In some embodiments, the processing device may cause display of the message configuration interface on a second device associated with a second user (e.g., a smart phone of the second user) that is remote from the location of the first user. In these embodiments, the second user is enabled to remotely specify a message that is to be presented by a wearable device worn by another user.

To cause the display of the message configuration interface, the processing device may transmit a set of instructions to the presenting device that, when executed by the device, causes the device to display the message configuration interface. In some embodiments, a client application (e.g., communication client 104) executing on the presenting device causes the first device to display the message configuration interface using locally stored data.

At operation 510, the processing device receives message configuration data based on input provided to the message configuration interface. The message configuration data specifies aspects of the message to be displayed on the outward-facing display of the wearable device. For example, the message configuration data may specify content (e.g., keyboard input data, graphical representations of users, and images), a color, a texture, a size, an object geometry, a typography, a typographical emphasis, or an adornment; or an animated movement or action.

At operation 515, the processing device causes the outward-facing display of the wearable device to present the message. The message may be viewed by an observer of the first user wearing the wearable device, for example, while engaged in an augmented reality experience.

In some embodiments, the outward-facing display component may be an LCD or similar display that is capable of displaying keyboard input data (e.g., text and emojis), graphical representations of users (e.g., an avatar), images, and other graphical content (e.g., augmented reality content). In embodiments in which the outward-facing display component comprises one or more LEDs (or other illuminating elements), the processing device can cause the one or more LEDs to illuminate. To convey the message, the processing device can cause the one or more LEDs to illuminate at a certain intensity or color, for a certain duration of time, or in a particular pattern.

To cause the outward-facing display component to present the message, the processing device can provide a set of instructions that, when executed by the wearable device, cause the outward-facing display component to present the message. In embodiments in which the wearable device is a primary device, the processing device can provide the set of instructions to the primary device to be passed on the wearable device or can provide the set of instructions directly to the wearable device.

Figure 6:
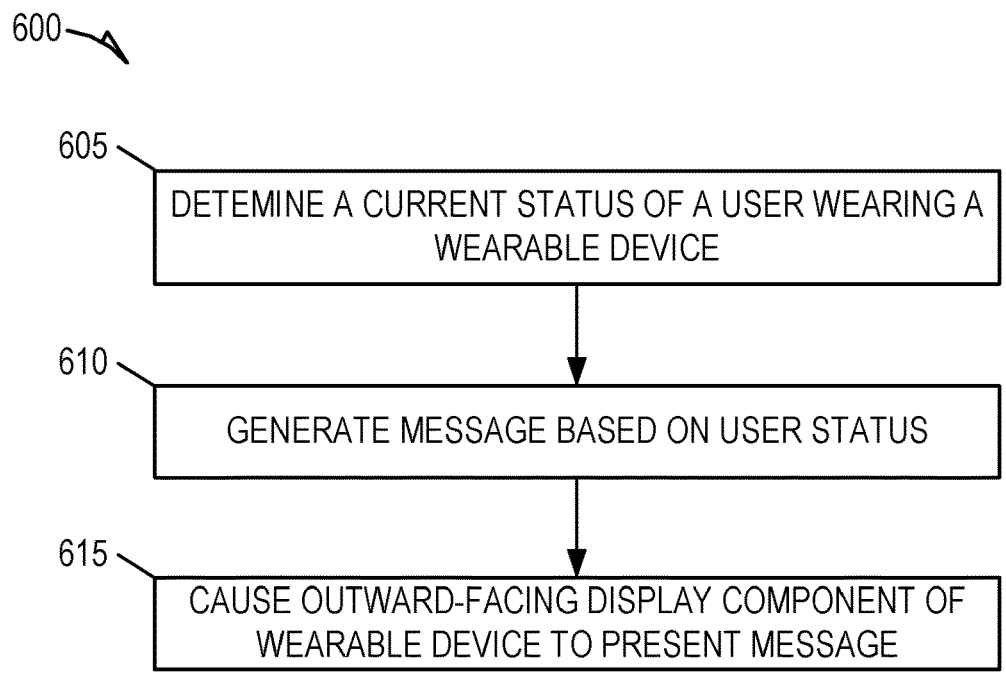
FIG. 6 is a flowchart illustrating operations of the communication system in performing a method for using an outward-facing display component of wearable device to communicate a message to an external observer, according to alternative example embodiments.

FIG. 6 is a flowchart illustrating operations of the communication system in performing a method 600 for using an outward-facing display component of wearable device to communicate a system-initiated message to an external observer, according to example embodiments. The method 600 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 600 is performed by functional components of the communication system 100. While the operations are described below as being performed by a processing device, it shall be appreciated that the operations of the method 500 may not necessarily be performed by the same processing device. As mentioned above, the location of certain functionality is a merely a design choice. Accordingly, any one or more of the operations of the method 600 can be performed by any one or more of the client devices 102-1 or 102-2, the communication server system 108, or the glasses 300.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Prior to initiation of the method 600, a user of a wearable device can be provided an option via a graphical user interface or other interface with the communication system 100 to enable or disable system-initiated message generation and presentation by the wearable device. Consistent with some embodiments, the method 600 can be initiated subsequent to receiving user input indicating that system-initiated messaging is to be enabled.

At operation 605, the processing device determines a current status of the user wearing a wearable device. For example, the processing device can infer the current status of the user based on context data about the user. The current status of the user can include a mood, a location, an activity, or the like. The context data can include sensor data, image data, and other data generated at the wearable device and in some embodiments, at a primary device to which the wearable device is configured as a companion. The context data can include any one or more of: user input data; biometric data; motion data; environmental data; position data; temporal data; event data describing an event; location data describing a location of the device; image data; weather conditions data; or audio data.

At operation 610, the processing device generates a message based on the current status of the user. The message indicates the current status of the user. For example, the message can be "busy", "happy", or "tired". In another example, the message can include a graphical representation of the user wearing the wearable device and the graphical representation is augmented to convey the status or mood of the user. The messages can, in other examples, present a current time, weather conditions or temperature. The processing device can also utilize information obtained from applications executed by the wearable device or a device in communication with the wearable device such as a current song being listened to by the user.

In some instances, the message can indicate that the user is engaged in an augmented reality experience. In these instances, the message comprises at least a portion of the augmented reality experience. For example, the message can comprise augmented reality content that is display to the user as part of the augmented reality experiences. In this example, the augmented reality content can be display along with an identifier or marker that allow other uses to access a similar augmented reality experience using an appropriately configured device. In another example, the messages comprises a mirror (e.g., a copy) of the augmented reality experience, in some embodiments. As discussed above, the augmented reality experience includes the presentation of augmented reality content by an inward-facing display component of the wearable device such that the augmented reality content appears to exist in a real-world environment that is visible via optical elements of the wearable device. To mirror this augmented reality experience, the processing device augments image data generated by a camera of the wearable device in which the real-world environment is visible. More specifically, the processing device augments the image data to include the augmented reality content overlaid on the real-world environment.

At operation 615, the processing device causes the outward-facing display of the wearable device to present the message. The message may be viewed by an external observer of the user wearing the wearable device, for example, while the user is engaged in an augmented reality experience.

In some embodiments, the outward-facing display component may display text, graphics, and other image content. In embodiments in which the outward-facing display component comprises one or more LEDs (or other illuminating elements), the processing device can cause the one or more LEDs to illuminate at a certain intensity or color, for a certain duration of time, or in a particular pattern.

In embodiments in which the message comprises augmented image content corresponding to a mirror of the augmented reality experience being engaged in by the user, the processing device causes the outward-facing display component to display one or more augmented image from the augmented image data.

To cause the outward-facing display component to present the message, the processing device can provide a set of instructions that, when executed by the wearable device, cause the outward-facing display component to present the message. In embodiments in which the wearable device is a primary device, the processing device can provide the set of instructions to the primary device to be passed on the wearable device or can provide the set of instructions directly to the wearable device.

Software Architecture

Figure 7:
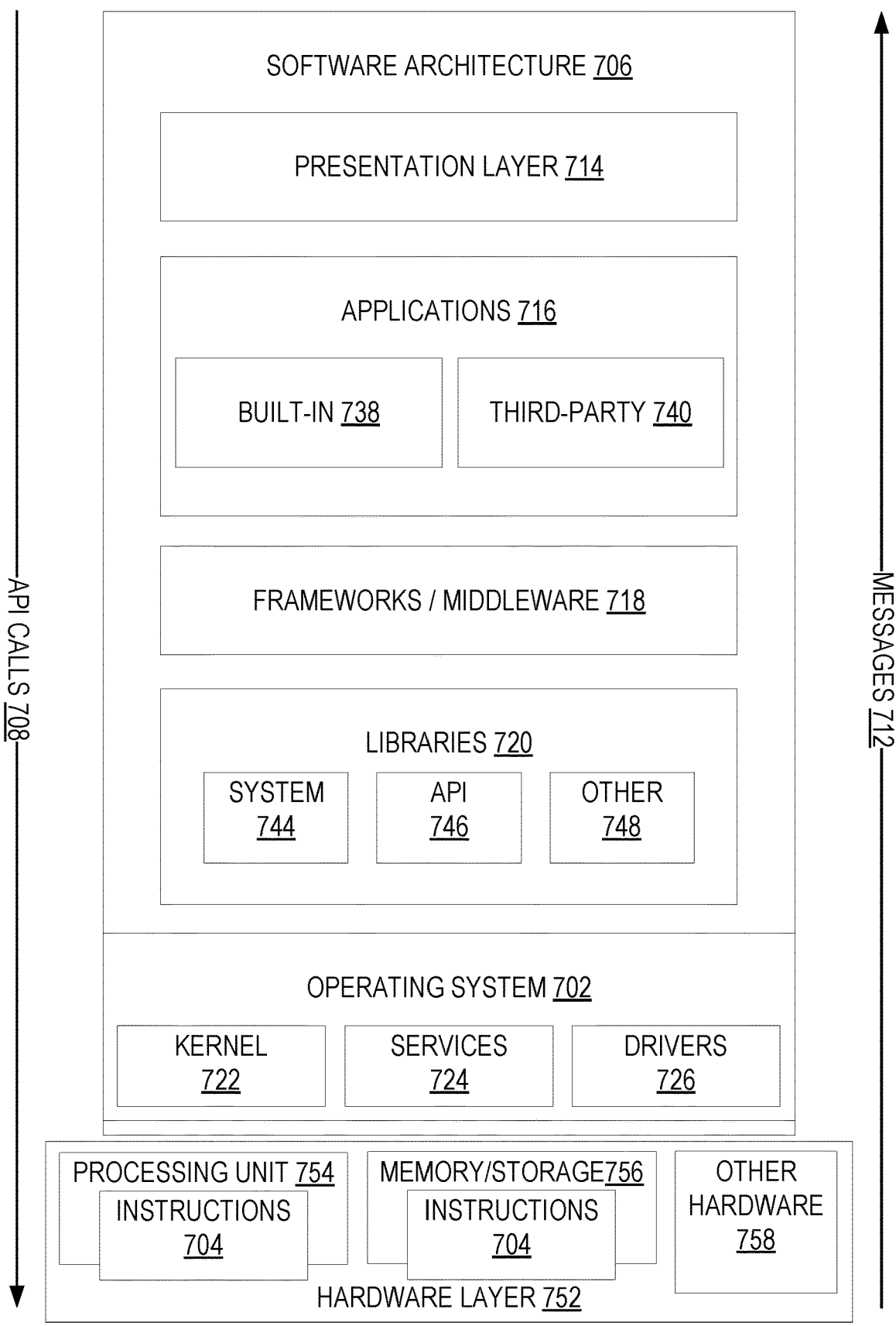
FIG. 7 is a block diagram illustrating a representative software architecture, which may be used in conjunction with various hardware architectures herein described, according to example embodiments.

FIG. 7 is a block diagram illustrating an example software architecture 706, which may be used in conjunction with various hardware architectures herein described. FIG. 7 is a non-limiting example of a software architecture, and it will be appreciated that many other architectures may be implemented to facilitate the functionality described herein. The software architecture 706 may execute on hardware such as a machine 800 of FIG. 8 that includes, among other things, processors 804, memory/storage 806, and I/O components 818. A representative hardware layer 752 is illustrated and can represent, for example, the machine 800 of FIG. 8. The representative hardware layer 752 includes a processing unit 754 having associated executable instructions 704. The executable instructions 704 represent the executable instructions of the software architecture 706, including implementation of the methods, components, and so forth described herein. The hardware layer 752 also includes memory and/or storage modules 756, which also have the executable instructions 704. The hardware layer 752 may also comprise other hardware 758.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke API calls 708 through the software stack and receive a response to the API calls 708 as messages 712. The layers illustrated are representative in nature and not all software architectures have all layers. For example, some mobile or special-purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 720 provide a common infrastructure that is used by the applications 716 and/or other components and/or layers. The libraries 720 provide functionality that allows other software components to perform tasks in an easier fashion than by interfacing directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media formats such as MPEG4, H.294, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 provide a higher-level common infrastructure that may be used by the applications 716 and/or other software components/modules. For example, the frameworks/middleware 718 may provide various GUI functions, high-level resource management, high-level location services, and so forth. The frameworks/middleware 718 may provide a broad spectrum of other APIs that may be utilized by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. The third-party applications 740 may include an application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 740 may invoke the API calls 708 provided by the mobile operating system (such as the operating system 702) to facilitate functionality described herein.

The applications 716 may use built-in operating system functions (e.g., kernel 722, services 724, and/or drivers 726), libraries 720, and frameworks/middleware 718 to create user interfaces to interact with users of the system. Alternatively, or additionally, in some systems interactions with a user may occur through a presentation layer, such as the presentation layer 714. In these systems, the application/component "logic" can be separated from the aspects of the application/component that interact with a user.

Figure 8:
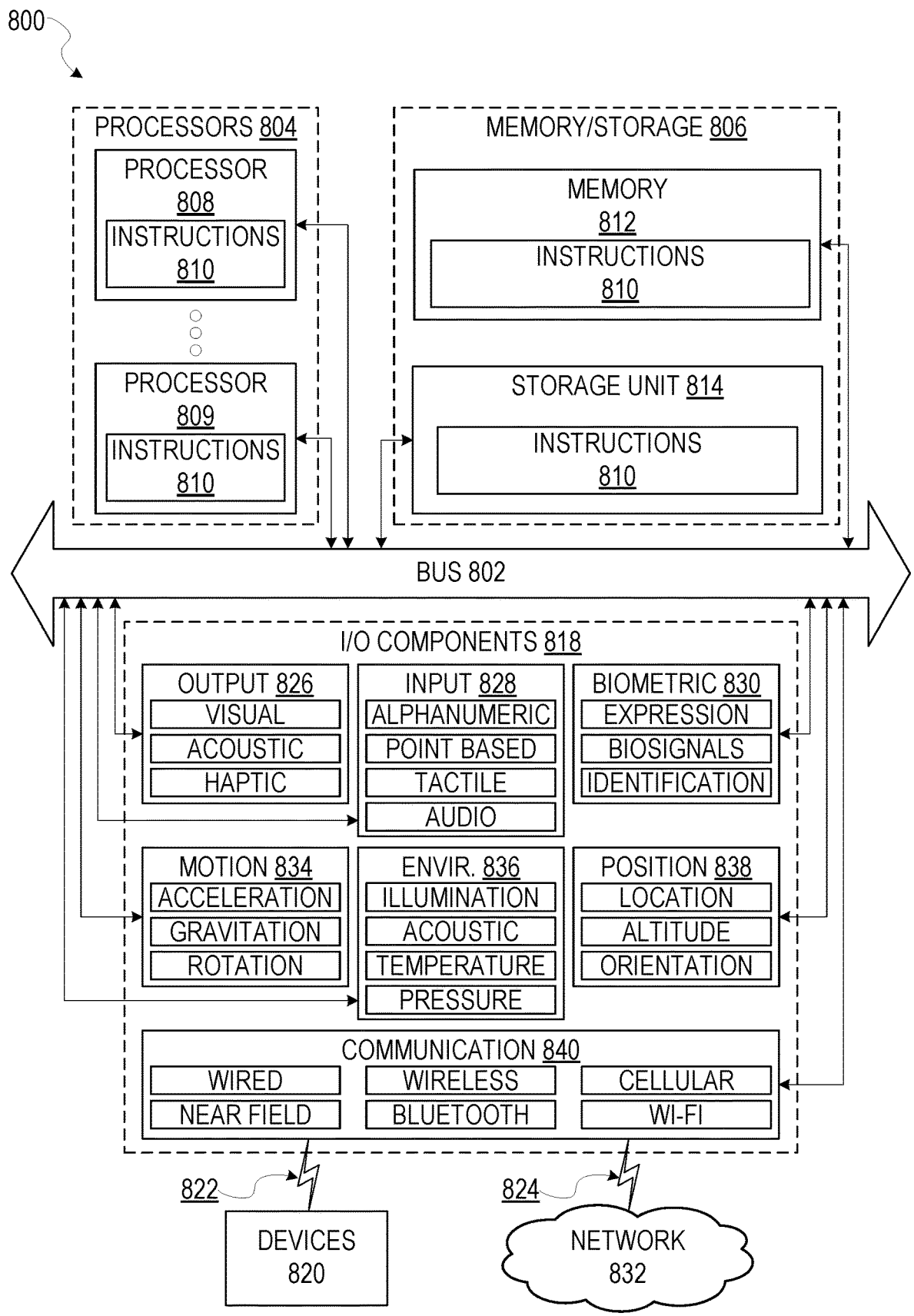
FIG. 8 is a block diagram illustrating components of a machine able to read instructions from a machine-readable medium (e.g., a machine-readable storage medium) and perform any one or more of the methodologies discussed herein, according to example embodiments.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory/storage 806, and I/O components 818, which may be configured to communicate with each other such as via a bus 802. In an example embodiment, the processors 804 (e.g., a CPU, a reduced instruction set computing (RISC) processor, a complex instruction set computing (CISC) processor, a (GPU, a digital signal processor (DSP), an ASIC, a radio-frequency integrated circuit (RFIC), another processor, or any suitable combination thereof) may include, for example, a processor 808 and a processor 809 that may execute the instructions 810. Although FIG. 8 shows multiple processors 804, the machine 800 may include a single processor with a single core, a single processor with multiple cores (e.g., a multi-core processor), multiple processors with a single core, multiple processors with multiple cores, or any combination thereof.

The memory/storage 806 may include a memory 812, such as a main memory, or other memory storage, and a storage unit 814, both accessible to the processors 804 such as via the bus 802. The storage unit 814 and memory 812 store the instructions 810 embodying any one or more of the methodologies or functions described herein. The instructions 810 may also reside, completely or partially, within the memory 812, within the storage unit 814, within at least one of the processors 804 (e.g., within the processor's cache memory), or any suitable combination thereof, during execution thereof by the machine 800. Accordingly, the memory 812, the storage unit 814, and the memory of the processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion, and the grouping is in no way limiting. In various example embodiments, the I/O components 818 may include output components 826 and input components 828. The output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen display configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen display that provides location and/or force of touches or touch gestures, or other tactile input components), audio input components (e.g., a microphone), and the like.

In further example embodiments, the I/O components 818 may include biometric components 830, motion components 834, environment components 836, or position components 838, among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 834 may include acceleration sensor components (e.g., accelerometer), gravitation sensor components, rotation sensor components (e.g., gyroscope), and so forth. The environment components 836 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 838 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via a coupling 824 and a coupling 822, respectively. For example, the communication components 840 may include a network interface component or other suitable device to interface with the network 832. In further examples, the communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4114, Ultra Code, UCC RSS-2D bar code, and other optical codes), or acoustic detection components (e.g., microphones to identify tagged audio signals). In addition, a variety of information may be derived via the communication components 840, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, device, or other tangible medium able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "HARDWARE COMPONENT" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor.

Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, (for example, giving date and time of day) sometimes accurate to a small fraction of a second.

What is claimed is:

1. A wearable device comprising:
a frame;
a pair of optical elements integrated into the frame;
a transparent inward-facing display component coupled to the frame, the transparent inward-facing display component to perform operations comprising:
displaying augmented reality content within a real-world environment that is visible via the pair of optical elements; and
causing presentation of a user interface comprising an option for a first user to enable system-initiated message generation;
a transparent outward-facing display component coupled to the frame, the transparent outward-facing display component to perform operations comprising:
presenting a user-specified message in response to first input data received remotely from a device associated with a second user remote from the first user comprising the user-specified message, the second user providing the user-specified message to a message configuration interface presented by the device, the message configuration interface enabling the second user to configure the transparent outward-facing display component of the wearable device; and
an outward-facing display component on a temple piece on a side of the frame, the outward-facing display component to perform operations comprising:
enabling display of a system-initiated message in response to second input data indicative of a selection of the option for the first user to enable the system-initiated message generation; and
based on the system-initiated message generation being enabled, presenting, on the outward-facing display component on the temple piece, the system-initiated message comprising text describing a current status of the first user that is automatically determined based on context data about the first user.

2. The wearable device of claim 1, wherein the message configuration interface is presented by the device using locally stored data.

3. The wearable device of claim 1, wherein the transparent inward-facing display component is a first layer of layered transparent displays included in the pair of optical elements, and the transparent outward-facing display component is a second layer of the layered transparent displays included in the pair of optical elements.

4. The wearable device of claim 1, wherein the transparent outward-facing display component includes one or more illuminating display elements.

5. The wearable device of claim 1, wherein the user-specified message further comprises one or more of keyboard input data, image data, or graphical content.

6. The wearable device of claim 1, wherein the system-initiated message further comprises image content or a graphical representation of the first user.

7. The wearable device of claim 1, wherein the context data comprises one or more of environmental data, location data, event data about a live event, or weather conditions data.

8. The wearable device of claim 1, wherein the current status includes one or more of a mood, a location, or an activity.

9. The wearable device of claim 1, wherein the message configuration interface provides a selectable set of message templates comprising one or more of text, graphics, or image content.

10. The wearable device of claim 1, wherein the presenting of the user-specified message includes presenting the augmented reality content presented by the transparent inward-facing display component.

11. The wearable device of claim 9, further comprising:
a camera to generate image data that includes a depiction of the real-world environment,
wherein the transparent outward-facing display component presents the system-initiated message by displaying augmented image data that includes the augmented reality content overlaid on the depiction of the real-world environment.

12. The wearable device of claim 1, wherein the system-initiated message further comprises an illumination of an illuminating element in a pattern specified by the first user.

13. The wearable device of claim 1, wherein the system-initiated message further comprises a mirror of the augmented reality content.

14. A method comprising:
causing a transparent inward-facing display component of a wearable device to perform operations comprising:
displaying augmented reality content, the transparent inward-facing display component being coupled to an optical element of the wearable device; and
presenting a user interface comprising an option for a first user to enable system-initiated message generation;
causing a transparent outward-facing display component of the wearable device to perform operations comprising:
presenting a user-specified message in response to first input data received remotely from a device associated with a second user remote from the first user comprising the user-specified message, the second user providing the user-specified message to a message configuration interface presented by the device, the message configuration interface enabling the second user to configure the transparent outward-facing display component of the wearable device; and
causing an outward-facing display component on a temple piece on a side of a frame of the wearable device to perform operations comprising:
enabling display of a system-initiated message in response to second input data indicative of a selection of the option for the first user to enable the system-initiated message generation; and
based on the system-initiated message generation being enabled, presenting, on the outward-facing display component on the temple piece, the system-initiated message comprising text describing a current status of the first user that is automatically determined based on context data about the first user.

15. The method of claim 14, further comprising:
allowing the second user to specify one or more aspects of the user-specified message; and
receiving message configuration data specifying the one or more aspects of the user-specified message, wherein the transparent outward-facing display component displays the user-specified message based on the message configuration data.

16. The method of claim 14, further comprising:
inferring the current status of the first user based on the context data; and
generating the text based on the current status of the first user.

17. The method of claim 14, wherein the user-specified message further comprises one or more of: keyboard input data, image data, or graphical content.

18. The method of claim 14, wherein:
the augmented reality content is presented to the first user, and
the system-initiated message is presented to the second user.

19. A system comprising:
a memory that stores instructions; and
one or more processors configured by the instructions to perform operations comprising:
causing a transparent inward-facing display component of a wearable device to perform operations comprising:
causing display of augmented reality content, the transparent inward-facing display component being coupled to an optical element of the wearable device, and
causing presentation of a user interface comprising an option for a first user to enable system-initiated message generation;
causing a transparent outward-facing display component of the wearable device to perform operations comprising:
causing presentation of a user-specified message in response to first input data received remotely from a device associated with a second user remote from the first user comprising the user-specified message, the second user providing the user-specified message to a message configuration interface presented by the device, the message configuration interface enabling the second user to configure the transparent outward-facing display component of the wearable device;
causing an outward-facing display component on a temple piece on a side of a frame of the wearable device to perform operations comprising:

enabling display of a system-initiated message in response to second input data indicative of a selection of the option for the first user to enable the system-initiated message generation; and based on the system-initiated message generation being enabled, causing presentation, on the outward-facing display component on the temple piece, the system-initiated message comprising text describing a current status of the first user that is automatically determined based on context data about the first user.

20. The system of claim 19, further comprising:

allowing the second user to configure one or more aspects of the user-specified message; and receiving message configuration data defining the one or more aspects of the user-specified message, wherein the transparent outward-facing display component displays the user-specified message based on the message configuration data.

* * * * *